United States Patent

[11] 3,608,061

| [72] | Inventor | Edmund F. McNally<br>46-44 Hanford St., Douglaston, N.Y. 11363 |
|---|---|---|
| [21] | Appl. No. | 754,462 |
| [22] | Filed | Aug. 21, 1968 |
| [45] | Patented | Sept. 21, 1971 |

[54] RADIOPAQUE ESOPHAGEAL MARSHMALLOW BOLUS
3 Claims, No Drawings

| [52] | U.S. Cl. | 424/4 |
|---|---|---|
| [51] | Int. Cl. | A61k 27/08 |
| [50] | Field of Search | 424/425 |

[56] References Cited
UNITED STATES PATENTS

| 2,307,189 | 1/1943 | Bell et al. | 424/5 |
|---|---|---|---|
| 2,801,203 | 7/1957 | Leb et al. | 424/4 |

*Primary Examiner*—Albert T. Meyers
*Assistant Examiner*—Frederick E. Waddell
*Attorney*—Brumbaugh, Graves, Donohue & Raymond

ABSTRACT: A radiopaque esophageal bolus which comprises a marshmallow containing a radiopaque material in an amount sufficient to render the bolus opaque when exposed to X-rays or roentgen rays.

RADIOPAQUE ESOPHAGEAL MARSHMALLOW BOLUS

Barium sulfate suspended in water has been used for many years as the standard contrast medium for the roentographic study of esophageal function and disease. However, the fluid nature of this suspension limits its value in the assessment of the caliber of esophageal lumen.

Thus, when a thin aqueous barium sulfate suspension is swallowed, the head of the barium sulfate column reaches the distal esophagus in 1 to 2 seconds. In the distal esophagus there is a momentary holdup of the passage of barium sulfate into the stomach, resulting in variable degrees of distention of the upper esophagus. The retained barium sulfate is then swept out of the esophagus by a peristaltic wave which begins within less than 1 second of the initiation of the swallow. This wave sweeps down the esophagus at a rate of 2 to 4 cm. per second, requiring 4 to 9 seconds to traverse the entire esophagus, the speed of the peristaltic wave varying with the consistency of the barium sulfate suspension. Thus, the degree to which the esophagus is distended by a barium sulfate suspension depends upon three factors, namely, 1) the consistency of the barium sulfate suspension; (2) the speed of the peristaltic complex; and (3) the duration of the holdup of swallowed material in the distal esophagus.

To slow down esophageal transit time, attempts have been made heretofore to make the vehicle in which the barium sulfate radiopaque agent is contained more viscous. Cylinders of gelatin impregnated with barium sulfate, cotton pledgets, and pieces of meat dipped in barium sulfate have been proposed. Tablets of barium sulfate and gelatin capsules filled with barium sulfate have also been suggested for evaluating the caliber of the lower esophageal ring.

It has also been proposed heretofore to introduce the commercial marshmallow as an esophageal bolus. It is pliable, elastic, and distends the esophageal lumen well but is not radiopaque. A barium sulfate suspension is swallowed along with the marshmallow, the bolus being visible as a radiolucent filling defect below or in a long column of barium sulfate. If the marshmallow should become arrested in an area of narrowing, it is dissolved in approximately 10 minutes by salivary ptyalin. If there is a block in the esophagus, the radiolucent marshmallow's path will be blocked and outlined by a column of barium sulfate above it. Thus, one knows that there is a block, but the cause thereof cannot be determined radiologically.

Hence, there is clearly a need for the radiopaque esophageal bolus provided by the present invention. The radiopaque esophageal bolus of the present invention comprises a marshmallow containing a radiopaque material, such as barium sulfate, in an amount sufficient to render the marshmallow radiopaque when exposed to X-rays or roentgen rays by conventional radiological procedure. The bolus of the invention possesses the following highly desirable characteristics: (1) it is nonfluid, plastic, elastic, and of such size that it may be easily swallowed whole by the patient; (2) it distends the esophagus maximally; and (3) it possesses the radiopacity of barium sulfate or its equivalent. Elasticity is a very desirable feature, since it will permit greater ease of swallowing. Plasticity permits it to be molded by surface irregularities and constrictions of the esophagus. These will alter the contour of the bolus and, as in a metal casting, the bolus will complement the mold. Moreover, the composition of the bolus of the invention is such that should it become lodged at a point of obstruction, it will dissolve spontaneously and not require surgical or endoscopic removal. Once beyond the narrow segment, the elasticity allows the bolus to reexpand and fill the esophageal lumen.

The radiopaque esophageal marshmallow bolus of the invention, as noted above, contains the conventional ingredients of a marshmallow plus a radiopaque material, such as barium sulfate. Other suitable radiopaque materials include Renografin 60 or 76 (Methylglucamine diatrizoate), Cystokin (3-acetamido-2,4,6,-triiodobenzoate), Hypaque 50 percent (3,5-diacetamido-2,4,6-triiodobenzoate), Conroy 400 (sodium iothalamate having 66.8 percent iodine concentration), Angio-conroy (sodium iothalamate having 80 percent iodine concentration), Cholografin (methylglucamine iodipamide) and Gastrografin (methylglucamine diatrizoate having 37 percent iodine concentration). For example, the bolus can be made from a mixture of water, gelatin, cornstarch, corn syrup, cane sugar and a radiopaque material, e.g., barium sulfate. A typical formulation thereof is as follows:

TABLE

| Components | Percent by Weight | |
|---|---|---|
| | General Range | Preferred Amounts |
| Gelatin | 2–3 | 2 |
| Water | 11–13 | 13 |
| Cornstarch | 3–4 | 3 |
| Corn Syrup | 31–41 | 35 |
| Radiopaque Material, e.g., Barium Sulfate | 19–37 | 29 |
| Sugar | 16–20 | 18 |

If one attempts to inject barium sulfate directly into a marshmallow, large pressures must be generated which usually rupture the marshmallow. There is also an uneven distribution of the barium sulfate in the matrix of the marshmallow, if the injection is not terminated by rupture.

A suitable method for the preparation of the radiopaque esophageal marshmallow bolus is as follows:

Dissolve the gelatin in water for 5 minutes. Place on a double boiler and liquefy. Add sugar to the double boiler and dissolve. Add this mixture to the rest of the dry ingredients and mix for 10 to 15 minutes. Place in a greased pan or beaker and allow to gel at room temperature overnight. Cut in a mold and roll in cornstarch or confectionary sugar. Store in a plastic bag free of air. Cubed segments of the marshmallow bolus of 8 to 10 cc. volume are cut as needed.

The radiopaque esophageal marshmallow bolus of the invention is particularly useful in the evaluation of dysphagia as well as in the study of esophageal neuromuscular disorders such as diffuse esophageal spasm.

Dysphagia signifies the failure of an ordinary passage of a swallowed bolus through the esophagus and into the stomach. The cause of dysphagia will usually be revealed by fluoroscopic study of the esophagus during the swallowing of the conventional barium sulfate suspension. However, because of the liquid nature of this material, the fluoroscopist may fail to detect an abnormality despite the presence of the symptoms. Thus, when dysphagia occurs, it is advisable that a bolus of sufficient size and consistency to elicit the symptoms of dysphagia be given along with barium sulfate and its progression down the esophagus observed. This procedure will usually demonstrate that the dysphagia is caused either by a defect of esophageal peristaltic activity or by an organic constriction of the esophageal lumen.

In using the radiopaque esophageal marshmallow bolus of the invention in the evaluation of dysphagia, the patient is instructed to place the bolus in his mouth and to swallow it whole without chewing. Once past the cricopharyngeus, the marshmallow distends the esophageal lumen and is propelled slowly down the esophagus, reaching the esophagogastric junction in 10 to 20 seconds. If an obstruction is encountered, symptoms of dysphagia occur and the marshmallow is deformed and forced through the area by the peristaltic wave. Once past the area of constriction, the bolus resumes its cuboidal shape with a prompt abatement of the dysphagia symptoms.

The radiopaque marshmallow bolus can also be used for the evaluation of peristaltic activity. In diffuse esophageal spasm, the bolus does not progress down the esophagus in an orderly fashion but instead is moved up and down by the segmental, spontaneous contractions of the esophageal wall which replace primary peristalsis.

In acute esophagitis, the progression of the bolus may be halted and distorted by spasmodic contraction of the lower esophagus. When this occurs, the patient may experience severe substernal pain. However, the spasm is only transient and with relaxation of this area of the esophagus, the marshmallow will resume its normal shape and the patient will be relieved of his substernal discomfort.

The radiopaque marshmallow bolus is also of value in the detection of sliding hiatal hernias. The failure of progression of the bolus is not associated with dysphagia and results from the absence of peristalsis in the herniated cardia of the stomach.

What is claimed is:

1. A radiopaque esophageal bolus which comprises a nonfluid, plastic, elastic marshmallow of such size that it may be swallowed whole and distends the esophagus of a patient maximally during passage therethrough, containing from about 2 percent to 3 percent by weight of gelatin, from about 3 percent to 4 percent by weight of cornstarch, from about 31 percent to about 4 percent by weight of corn syrup, from about 11 percent to about 13 percent by weight of water, from about 16 percent to about 20 percent by weight of sugar, and barium sulfate dispersed through the bolus in an amount sufficient to render a swallowed bolus readily distinguishable from adjacent esophageal tissue in a diagnostic X-ray examination.

2. The radiopaque esophageal bolus of claim 1, in which the amount of barium sulfate is from about 19 percent to about 37 percent by weight.

3. The radiopaque esophageal bolus of claim 1, which comprises a nonfluid, plastic, elastic marshmallow containing about 29 percent by weight of barium sulfate, about 2 percent by weight of gelatin, about 3 percent by weight of cornstarch, about 35 percent by weight of corn syrup, about 13 percent by weight of water, and about 18 percent by weight of sugar.

PO-1050
(5/69)

UNITED STATES PATENT OFFICE
CERTIFICATE OF CORRECTION

Patent No. 3,608,061                Dated September 21, 1971

Inventor(s)    Edmund F. McNally

It is certified that error appears in the above-identified patent and that said Letters Patent are hereby corrected as shown below:

Column 4, line 2, "4 percent" should be -- 41 percent --.

Signed and sealed this 4th day of April 1972.

(SEAL)
Attest:

EDWARD M.FLETCHER,JR.
Attesting Officer                    Commissioner of Patents